(12) United States Patent  
Rowlette, Jr.

(10) Patent No.: US 9,097,396 B2  
(45) Date of Patent: Aug. 4, 2015

(54) LED BASED LIGHTING SYSTEM

(75) Inventor: John R. Rowlette, Jr., Raleigh, NC (US)

(73) Assignee: Cree, Inc., Durham, NC (US)

( * ) Notice: Subject to any disclaimer, the term of this patent is extended or adjusted under 35 U.S.C. 154(b) by 221 days.

(21) Appl. No.: 13/602,954

(22) Filed: Sep. 4, 2012

(65) Prior Publication Data

US 2014/0063837 A1     Mar. 6, 2014

(51) Int. Cl.
*F21K 99/00* (2010.01)
*F21Y 101/02* (2006.01)
*F21V 8/00* (2006.01)

(52) U.S. Cl.
CPC . *F21K 9/52* (2013.01); *F21K 9/135* (2013.01); *G02B 6/0008* (2013.01); *F21Y 2101/02* (2013.01); *G02B 6/0006* (2013.01)

(58) Field of Classification Search
CPC ..... G02B 6/0008; F21S 10/023; F21K 9/135; F21K 9/52; F21K 9/1355; F21K 9/10; F21K 9/13
USPC ......... 362/552, 555, 558, 569, 581, 147, 650, 362/311.02, 332, 342, 312–316
See application file for complete search history.

(56) References Cited

U.S. PATENT DOCUMENTS

| | | | |
|---|---|---|---|
| 3,581,162 A | 5/1971 | Wheatley | |
| 5,463,280 A | 10/1995 | Johnson | |
| 5,561,346 A | 10/1996 | Byrne | |
| 5,585,783 A | 12/1996 | Hall | |
| 5,655,830 A | 8/1997 | Ruskouski | |
| 5,688,042 A | 11/1997 | Madadi et al. | |
| 5,806,965 A | 9/1998 | Deese | |
| 5,947,588 A | 9/1999 | Huang | |
| 5,949,347 A | 9/1999 | Wu | |
| 6,220,722 B1 | 4/2001 | Begemann | |
| 6,227,679 B1 | 5/2001 | Zhang et al. | |
| 6,234,648 B1 | 5/2001 | Borner et al. | |
| 6,250,774 B1 | 6/2001 | Begemann et al. | |
| 6,276,822 B1 | 8/2001 | Bedrosian et al. | |
| 6,465,961 B1 | 10/2002 | Cao | |
| 6,523,978 B1 | 2/2003 | Huang | |
| 6,523,984 B2 * | 2/2003 | Belfer ........................ | 362/551 |
| 6,550,953 B1 | 4/2003 | Takahashi et al. | |
| 6,634,770 B2 | 10/2003 | Cao | |
| 6,659,632 B2 | 12/2003 | Chen | |
| 6,709,132 B2 | 3/2004 | Ishibashi | |
| 6,803,607 B1 | 10/2004 | Chan et al. | |
| 6,848,819 B1 | 2/2005 | Arndt et al. | |
| 6,864,513 B2 | 3/2005 | Lin et al. | |
| 6,948,829 B2 | 9/2005 | Verdes et al. | |

(Continued)

FOREIGN PATENT DOCUMENTS

| | | |
|---|---|---|
| EP | 1058221 A2 | 12/2000 |
| EP | 0890059 B1 | 6/2004 |

(Continued)

*Primary Examiner* — Laura Tso
*Assistant Examiner* — Kenny C Sokolowski
(74) *Attorney, Agent, or Firm* — Dennis J. Williamson; Moore & Van Allen PLLC (57) ABSTRACT

An LED lighting system comprises an LED assembly for emitting light. A bulb comprises an enclosure and an optic element in the enclosure for receiving the light from the LED assembly and transmitting the light from the enclosure. An Edison-style or other traditional-style base is provided on the bulb for connecting the bulb to an Edison-style or other traditional-style socket.

18 Claims, 6 Drawing Sheets

(56) References Cited

U.S. PATENT DOCUMENTS

| | | |
|---|---|---|
| 6,982,518 B2 | 1/2006 | Chou et al. |
| 7,048,412 B2 | 5/2006 | Martin et al. |
| 7,080,924 B2 | 7/2006 | Tseng et al. |
| 7,086,756 B2 | 8/2006 | Maxik |
| 7,086,767 B2 | 8/2006 | Sidwell et al. |
| 7,144,135 B2 | 12/2006 | Martin et al. |
| 7,165,866 B2 | 1/2007 | Li |
| 7,172,314 B2 | 2/2007 | Currie et al. |
| 7,213,940 B1 * | 5/2007 | Van De Ven et al. ......... 362/231 |
| 7,261,455 B2 * | 8/2007 | Schnuckle et al. ............ 362/569 |
| 7,354,174 B1 | 4/2008 | Yan |
| 7,396,142 B2 | 7/2008 | Laizure, Jr. et al. |
| 7,600,882 B1 | 10/2009 | Morejon et al. |
| 7,726,836 B2 | 6/2010 | Chen |
| 7,810,974 B2 * | 10/2010 | Van Rijswick et al. ....... 362/555 |
| 7,824,065 B2 | 11/2010 | Maxik |
| 7,976,206 B2 * | 7/2011 | Wu et al. ...................... 362/555 |
| 8,021,025 B2 | 9/2011 | Lee |
| 8,253,316 B2 | 8/2012 | Sun et al. |
| 8,272,762 B2 | 9/2012 | Maxik et al. |
| 8,274,241 B2 | 9/2012 | Guest et al. |
| 8,277,082 B2 | 10/2012 | Dassanayake et al. |
| 8,282,250 B1 | 10/2012 | Dassanayake et al. |
| 8,292,468 B2 | 10/2012 | Narendran et al. |
| 8,322,896 B2 | 12/2012 | Falicoff et al. |
| 8,371,722 B2 | 2/2013 | Carroll |
| 8,400,051 B2 | 3/2013 | Hakata et al. |
| 8,415,865 B2 | 4/2013 | Liang et al. |
| 8,421,320 B2 | 4/2013 | Chuang |
| 8,421,321 B2 | 4/2013 | Chuang |
| 8,421,322 B2 | 4/2013 | Carroll et al. |
| 8,449,154 B2 | 5/2013 | Uemoto et al. |
| 8,502,468 B2 | 8/2013 | Li et al. |
| 8,641,237 B2 | 2/2014 | Chuang |
| 8,653,723 B2 | 2/2014 | Cao et al. |
| 8,696,168 B2 | 4/2014 | Li et al. |
| 8,740,415 B2 | 6/2014 | Wheelock |
| 8,750,671 B1 | 6/2014 | Kelly et al. |
| 8,752,984 B2 | 6/2014 | Lenk et al. |
| 8,760,042 B2 | 6/2014 | Sakai et al. |
| 2004/0201990 A1 | 10/2004 | Meyer |
| 2009/0021934 A1 * | 1/2009 | Chu ............................. 362/241 |
| 2009/0184618 A1 | 7/2009 | Hakata et al. |
| 2010/0013409 A1 * | 1/2010 | Quek et al. .................... 315/294 |
| 2011/0051424 A1 * | 3/2011 | Balazs et al. .................. 362/294 |
| 2012/0040585 A1 | 2/2012 | Huang |
| 2013/0063042 A1 * | 3/2013 | Bora et al. .................... 315/292 |

FOREIGN PATENT DOCUMENTS

| | | |
|---|---|---|
| GB | 2345954 A | 7/2000 |
| JP | H09265807 A | 10/1997 |
| JP | 2000173304 A | 6/2000 |
| JP | 2001118403 A | 4/2001 |
| WO | 0124583 A1 | 4/2001 |
| WO | 0160119 A2 | 8/2001 |
| WO | 2012011279 A1 | 1/2012 |
| WO | 2012031533 A1 | 3/2012 |

\* cited by examiner

LED BASED LIGHTING SYSTEM

BACKGROUND

Light emitting diode (LED) lighting systems are becoming prevalent as replacements for older lighting systems. LED systems are an example of solid state lighting (SSL) and have advantages over traditional lighting solutions, such as incandescent and fluorescent lighting, because they use less energy, are more durable, operate longer, can be combined in multi-color arrays that can be controlled to deliver virtually any color light, and generally contain no lead or mercury. A solid-state lighting system may take the form of a lighting unit, light fixture, light bulb, or a lamp.

An LED lighting system may include, for example, a packaged light emitting device including one or more light emitting diodes (LEDs), which may include inorganic LEDs, which may include semiconductor layers forming p-n junctions and/or organic LEDs, which may include organic light emission layers. Light perceived as white or near-white may be generated by a combination of red, green, and blue ("RGB") LEDs. Output color of such a device may be altered by separately adjusting the supply of current to the red, green, and blue LEDs. Another method for generating white or near-white light is by using a lumiphor such as a phosphor. Still another approach for producing white light is to stimulate phosphors or dyes of multiple colors with an LED source. Many other approaches can be taken.

Traditional incandescent bulbs typically comprise a wire filament supported on a glass stem that is fused in the interior of the bulb. Wires extend through the stem between the bulb's Edison screw base and the filament to provide electric current from the bulb's base to the filament.

SUMMARY

In one embodiment, an LED lighting system comprises an LED assembly for emitting light. A bulb comprises an enclosure and an optic element in the enclosure for receiving the light emitted by the LED assembly and dispersing the light from the enclosure. A base is connected to the enclosure where the base being configured to be engageable with a socket;

The base may comprise an Edison-style base and the socket may comprise an Edison-style socket. An optical transmitter may receive the light emitted from the LED assembly and transmit the light to the Edison-style socket. The optical transmitter may comprise a fiber optic cable. The LED assembly may be positioned in a fixture remote from the socket and the optical transmitter may be removably connected to the fixture. The optical transmitter may be operatively coupled to an optical connector in the Edison-style socket. A lens may be provided in the fixture for receiving the light from the LED assembly and focusing the light to be received by the optical connector. The lens may receive the light from the LED assembly and focus the light to be received by the optic element. The optic element may be transparent. The optic element may comprise a light emitting area. The light emitting area may comprise a light scattering surface. A wire may be connected to the optic element adjacent the light emitting area. A switch may be provided for altering current delivered to the LED assembly where the color of the light changes in response to the current. The color of the light may change to red/orange/red-orange in response to the lowering of the current. The LED assembly may be located in the Edison-style socket. The base may comprise a traditional-style base and the socket may comprise a traditional-style socket. The LED assembly may be located in the base.

DETAILED DESCRIPTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Unless otherwise expressly stated, comparative, quantitative terms such as "less" and "greater", are intended to encompass the concept of equality. As an example, "less" can mean not only "less" in the strictest mathematical sense, but also, "less than or equal to."

The terms "LED" and "LED device" as used herein may refer to any solid-state light emitter. The terms "solid state light emitter" or "solid state emitter" may include a light emitting diode, laser diode, organic light emitting diode, and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive materials. A solid-state lighting device produces light (ultraviolet, visible, or infrared) by exciting electrons across the band gap between a conduction band and a valence band of a semiconductor active (light-emitting) layer, with the electron transition generating light at a wavelength that depends on the band gap. Thus, the color (wavelength) of the light emitted by a solid-state emitter depends on the materials of the active layers thereof. In various embodiments, solid-state light emitters may have peak wavelengths in the visible range and/or be used in combination with lumiphoric materials having peak wavelengths in the visible range. Multiple solid state light emitters and/or multiple lumiphoric materials (i.e., in combination with at least one solid state light emitter) may be used in a single device, such as to produce light perceived as white or near white in character. In certain embodiments, the aggregated output of multiple solid-state light emitters and/or lumiphoric materials may generate warm white light output having a color temperature range of from about 2200K to about 6000K.

Solid state light emitters may be used individually or in combination with one or more lumiphoric materials (e.g., phosphors, scintillators, lumiphoric inks) and/or optical elements to generate light at a peak wavelength, or of at least one desired perceived color (including combinations of colors that may be perceived as white). Inclusion of lumiphoric (also called 'luminescent') materials in lighting devices as described herein may be accomplished by direct coating on solid state light emitter, adding such materials to encapsulants, adding such materials to lenses, by embedding or dispersing such materials within lumiphor support elements, and/or coating such materials on lumiphor support elements. Other materials, such as light scattering elements (e.g., particles) and/or index matching materials, may be associated with a lumiphor, a lumiphor binding medium, or a lumiphor support element that may be spatially segregated from a solid state emitter.

It should also be noted that the term "lighting system" is meant to encompass not only a solid-state replacement for a traditional incandescent bulb as illustrated herein, but also replacements for fluorescent bulbs, replacements for complete fixtures, and any type of light fixture that may be designed as a solid state fixture for mounting on walls, in or on ceilings, on posts, in lamps, on vehicles and/or other applications.

In a traditional incandescent bulb a filament, such as a tungsten filament, may be supported by support wires secured to or embedded in a glass stem where the stem extends from the bulb base. The support wires position the filament at the approximate center of the enclosure such that light is projected substantially uniformly over the surface of the enclosure, although some variation in the dispersion of light over the surface area of the enclosure may occur. Current is delivered to the filament by electrical wires that extend from the electrically conductive base, through the glass stem and are connected to the filament. The electrical wires may also serve as the physical support for the filament. Electrical current is passed through the filament causing the filament to heat and produce visible light. The filament is visible when the light is turned off as a wire and is visible in use as a glowing component, especially when the light is dimmed. When low current is passed through the filament, such as in a dimmer application, the filament may glow as orange-red light.

The construction of the LED lighting system of the invention creates an LED based lighting system that provides the appearance of a traditional incandescent bulb. In one embodiment the lamp comprises an LED light source operatively connected to an "Edison-style" socket such as by a fiber optic cable. A bulb having an "Edison-style" base may be connected to the Edison-style socket to emit light where the bulb comprises an internal structure that has an appearance that corresponds to or mimics the internal structure of a traditional incandescent bulb. As used herein the term "Edison-style" is used to mean a bulb base having external screwthreads and a socket having mating internal screwthreads where the base and socket are dimensioned to correspond to, and to have the external appearance of, standard Edison screw bases and sockets. Standard Edison screw bases and sockets come in a variety of sizes and thread pitches. In an actual Edison screw, the Edison screw provides both the physical connection between the socket and the base and is part of the electrical path for providing current from a power source to the filament. In the Edison-style screw of the invention the Edison-style screw provides the physical connection but may not form part of the electrical path in all embodiments.

In other embodiments the lamp may comprise an LED light source connected to a "Bayonet-style" socket such as by a fiber optic cable. A bulb having a "Bayonet-style" base is connected to the Bayonet-style socket to emit light where the bulb comprises an internal structure that mimics the internal structure of a traditional incandescent bulb. As used herein, the term "Bayonet-style" is used to mean a bulb base having external lugs and a socket having mating internal lug receptacles where the base and socket are dimensioned to correspond to, and to have the external appearance of, standard bayonet connectors. Typically, in a standard bayonet connector the base is inserted into the socket and is rotated a partial turn to engage the lugs with the receptacles. Standard bayonet connectors come in a variety of sizes. In an actual bayonet connector the bayonet connector provides both the physical connection between the socket and the base and is part of the electrical path for providing current from a power source to the filament. In the Bayonet-style connector of the invention the Bayonet-style connector provides the physical connection but may not form part of the electrical path in all embodiments.

As used herein the terms "Edison-style" and "Bayonet-style" connectors may be referred to herein collectively as "traditional-style" connectors where traditional-style means connectors, e.g. bases and sockets, having a physical form factor that is similar in appearance to the traditional connectors (e.g. Edison screw, bayonet or the like) but that use the LED technology as described herein.

Figure 1:
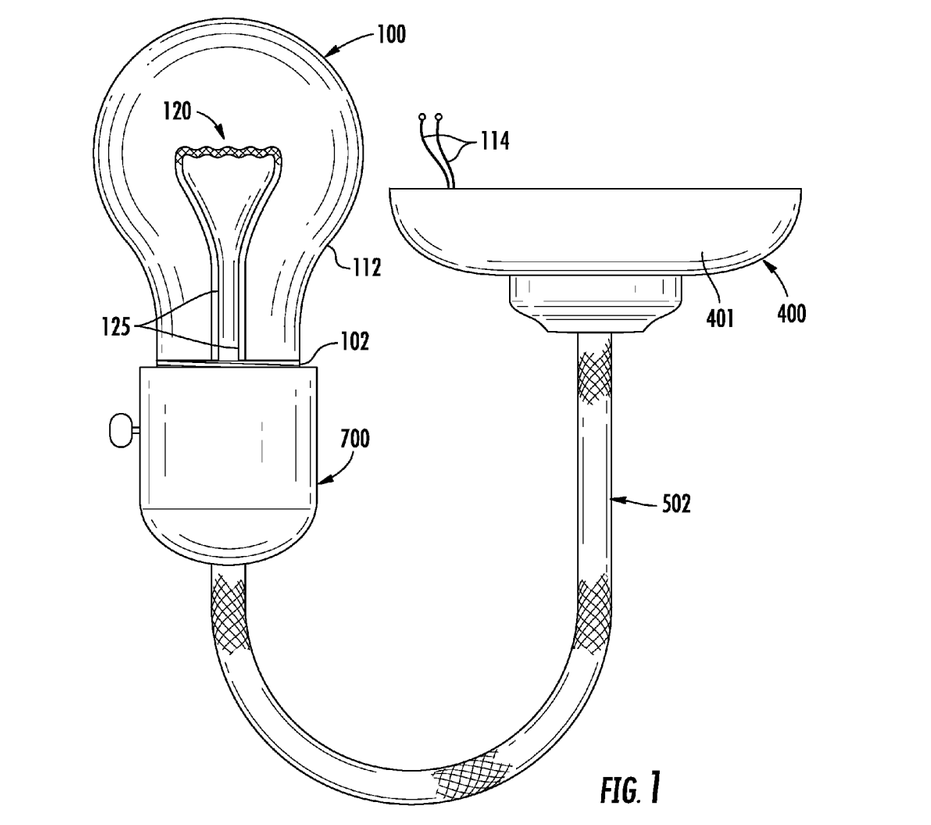
FIG. 1 is a side view of an LED lighting system according to embodiments of the invention.
Figure 2:
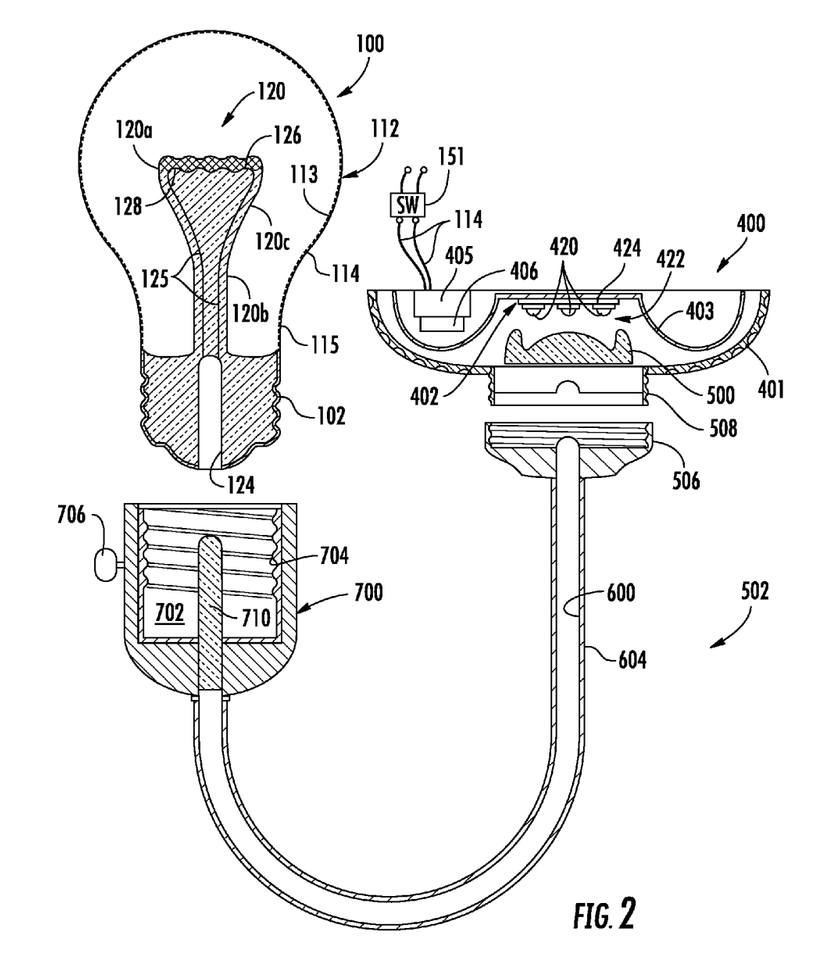
FIG. 2 is a section view of the LED lighting system of FIG. 1.

FIGS. 1 and 2 show a lighting system according to some embodiments of the present invention. A bulb 100 is shown having a form factor that may correspond to an A-series lamp with an Edison-style base 102 and an enclosure 112. Bulb 100 may be designed to serve as a solid-state replacement for an ANSI A19 incandescent bulb. Bulb 100 may have other form factors such as an ANSI standard A21 or A23. The bulb 100 may also have the size and form factor of a smaller incandescent bulb, such as that commonly used in appliances, ceiling fans, chandeliers or the like. The bulb may conform to other standards or to other bulb form factors. The enclosure 112 is, in some embodiments, a transparent enclosure of similar shape to that commonly used in household incandescent bulbs. The enclosure may be formed of glass, polycarbonate or other material. The enclosure 112 may be coated on the inside with silica 113, providing a diffuse scattering layer that produces a more uniform far field pattern, or the enclosure may be transparent. It should also be noted that in this or any of the embodiments shown here, the optically transmissive enclosure 112 or a portion of the optically transmissive enclosure could be coated or impregnated with phosphor or a diffuser.

Figure 7:
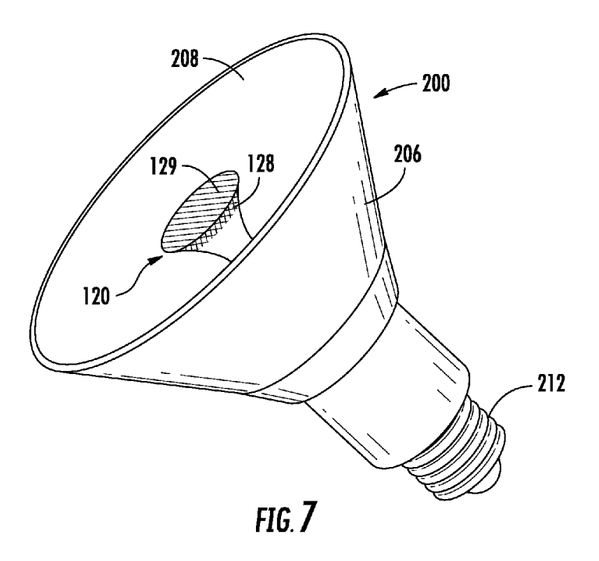
FIG. 7 is a perspective view of an LED lighting system according to yet another embodiment of the invention.

FIG. 7 is a perspective view of a PAR-style bulb 200 such as a replacement for a PAR-38 incandescent bulb. Bulb 200 includes a glass or plastic lens 208, which covers the front of lamp 200, and an enclosure such as a parabolic enclosure 206 made of aluminum or the like. Bulb 200 again includes an Edison-style base 212. Reflector 206 and lens 208 together form an optically transmissive enclosure for the lamp, albeit light transmission in this case is directional. Note that a lamp like lamp 200 could be formed with a unitary enclosure, formed as an example from glass, appropriately shaped and silvered or coated on an appropriate portion to form a directional, optically transmissive enclosure.

Referring again to FIGS. 1 and 2, in one embodiment the LED light source comprises a fixture 400 that comprises an external housing 401 that retains and supports a submount 403 made of, for example, aluminum that supports a solid-state lighting system such as an LED assembly 402. A power supply 405 and drivers 406 for the LED assembly 402 may be mounted in housing 401 and may be mounted on the submount 403 or these components may be mounted on separate structures inside of the housing 401. While in a preferred embodiment the LED assembly 402, power supply 405 and drivers 406 are all located in housing 401 some of the components such as the power supply and/or drivers may be located remotely from housing 401. The housing 401 and submount 403 may be made of a thermally conductive material such as aluminum and may be thermally coupled to the LED assembly 402 to create a heat sink structure such that heat generated by the LED assembly 402 is dissipated to the ambient environment by the housing 401 and/or submount 403. A heat sink structure in addition to the submount may be provided that is thermally coupled to the LED assembly and may comprise structures such as fins, vanes or the like.

The LED assembly 402 is provided with light emitting LEDs and/or LED packages 420. Multiple LEDs 420 may be used together, forming an LED array 422. The LEDs 420 can be mounted on or fixed within the lamp in various ways. In at least some example embodiments, a PCB board 424 may be used. The LEDs 420 in the LED array 422 include LEDs which may comprise an LED die disposed in an encapsulant such as silicone, and LEDs which may be encapsulated with a phosphor to provide local wavelength conversion, as will be described later when various options for creating white light are discussed. A wide variety of LEDs and combinations of LEDs may be used in the LED assembly 402 as described herein.

Some embodiments of the invention can include a multiple LED sets coupled in series. The power supply in such an embodiment can include a plurality of current diversion circuits, respective ones of which are coupled to respective nodes of the LED sets and configured to operate responsive to bias state transitions of respective ones of the LED sets. In some embodiments, a first one of the current diversion circuits is configured to conduct current via a first one of the LED sets and is configured to be turned off responsive to current through a second one of the LED sets. The first one of the current diversion circuits may be configured to conduct current responsive to a forward biasing of the first one of the LED sets and the second one of the current diversion circuit may be configured to conduct current responsive to a forward biasing of the second one of the LED sets.

In some of the embodiments described immediately above, the first one of the current diversion circuits is configured to turn off in response to a voltage at a node. For example a resistor may be coupled in series with the sets and the first one of the current diversion circuits may be configured to turn off in response to a voltage at a terminal of the resistor. In some embodiments, for example, the first one of the current diversion circuits may include a bipolar transistor providing a controllable current path between a node and a terminal of a power supply, and current through the resistor may vary an emitter bias of the bipolar transistor. In some such embodiments, each of the current diversion circuits may include a transistor providing a controllable current path between a node of the sets and a terminal of a power supply and a turn-off circuit coupled to a node and to a control terminal of the transistor and configured to control the current path responsive to a control input. A current through one of the LED sets may provide the control input. The transistor may include a bipolar transistor and the turn-off circuit may be configured to vary a base current of the bipolar transistor responsive to the control input.

With respect to the features of the LED assembly and related electronic described above with various example embodiments of a lamp, the features can be combined in various ways. For example, the various methods of including phosphor in the lamp can be combined and any of those methods can be combined with the use of various types of LED arrangements such as bare die versus encapsulated or packaged LED devices. The embodiments shown and described herein are examples only and are intended to be illustrative of various design options for a LED lighting system.

LEDs and/or LED packages used with an embodiment of the invention and can include light emitting diode chips that emit hues of light that, when mixed, are perceived in combination as white light. Phosphors can be used as described to add yet other colors of light by wavelength conversion. For example, blue or violet LEDs can be used in the LED assembly of the lamp and the appropriate phosphor can be in any of the ways mentioned above. LED devices can be used with phosphorized coatings packaged locally with the LEDs or with a phosphor coating the LED die as previously described. For example, blue-shifted yellow (BSY) LED devices, which typically include a local phosphor, can be used with a red phosphor on or in the optically transmissive enclosure or inner envelope to create substantially white light, or combined with red emitting LED devices in the array to create substantially white light. Such embodiments can produce light with a CRI of at least 70, at least 80, at least 90, or at least 95.

A lighting system using the combination of BSY and red LED devices referred to above to make substantially white light can be referred to as a BSY plus red or "BSY+R" system. In such a system, the LED devices used include LEDs operable to emit light of two different colors. In one example embodiment, the LED devices include a group of LEDs, wherein each LED, if and when illuminated, emits light having dominant wavelength from 440 to 480 nm. The LED devices include another group of LEDs, wherein each LED, if and when illuminated, emits light having a dominant wavelength from 605 to 630 nm. A phosphor can be used that, when excited, emits light having a dominant wavelength from 560 to 580 nm, so as to form a blue-shifted-yellow light with light from the former LED devices. A further detailed example of using groups of LEDs emitting light of different wavelengths to produce substantially while light can be found in issued U.S. Pat. No. 7,213,940, which is incorporated herein by reference.

LED devices 420 may be individually encapsulated, each in a package with its own lens. In some embodiments, at least one of these devices is encapsulated with a phosphor by coating the lens of the LED package with a phosphor.

Wires or other electrical conductors 114 run from the LED light source fixture 400 to an external AC power source such as a building's electrical grid to carry both sides of the supply to provide critical current to the LEDs. Power supply 405 and/or driver(s) 406 may form all or a portion of the electrical path between the mains and the LEDs 420. The LED light source fixture 400 may also include only part of the power supply circuitry while other components reside outside of the housing 401. With the embodiment of FIGS. 1 and 2, as with many other embodiments of the invention, the term "electrical path" can be used to refer to the entire electrical path to the LED array, including an intervening power supply disposed between the electrical connection that would otherwise provide power directly to the LEDs and the LED array, or it may be used to refer to the connection between the mains and all the electronics in the lamp, including the power supply. The term may also be used to refer to the connection between the power supply and the LED array.

A hyperbolic optic or lens 500 receives the light from the LED assembly 402 and focuses the light to be received by an optical transmitter 502. While a hyperbolic optic or lens 500 is illustrated any optic that functions to focus and transmit the light from the LED assembly 402 such that the light may be received by optical transmitter 502 may be used. The optical transmitter 502 transmits the light from the LED assembly 402 to the Edison-style socket 700. In one embodiment the optical transmitter 502 comprises a fiber optic cable 600 for transmitting the light to the socket 700. The optical transmitter 502 is positioned relative to the lens 500 such that it receives the focused light emitted from the lens and transmits the light along the length of the cable 600. The optical transmitter 502 may be removably disconnected from the fixture 400. For example, the optical transmitter 502 may comprise a coupling 506 on one end of the cable 600 that engages a mated coupling 508 formed on housing 401. The coupling 506 may comprise screwthreads and coupling 508 may comprise mating screwthreads that may be screwed together such that a first end of fiber optic cable 600 is positioned to receive the light from lens 500. In other embodiments, the optical transmission 502 may be permanently connected to the fixture 400. The housing 401 and coupling 506 may be provided with any decorative appearance and in one embodiment are provided with an outward appearance that corresponds to a traditionally styled light fixture. Similarly, the fiber optic cable 600 may be covered in a decorative sheathing 604 that mimics traditional electrical conductors. For example, the decorative sheathing 604 may comprise a braided decorative sleeve that mimics the style of a traditional light fixture cable or wire.

The opposite end of the fiber optic cable 600 terminates at Edison-style socket 700. The Edison-style socket 700 comprises a receptacle 702 having internal screwthreads 704 and may have internal dimensions that correspond to standard size Edison sockets and bases. The Edison-style socket 700 may comprise an external structure similar in appearance to the external insulator structure of a standard Edison socket and may include decorative details such as a switch 706. Switch 706 may be inoperative and may be provided to simulate the look of an Edison-style socket or other traditional-style socket. The fiber optic cable 600 is fixed in the socket 700 and terminates in a light pipe or other optical connector 710 such as a bayonet connector, screw connector, snap-fit connector or the like. In one embodiment, the fixture 400 may be mounted to a wall or other structure with the socket 700 supported remotely from the fixture 400 on the wall or other surface and the decorative cable cover 604 exposed and visible.

Figure 3:
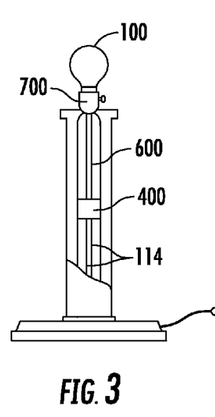
FIGS. 3 and 4 are partial section views of LED lighting systems according to other embodiments of the invention.

Further, in another embodiment, the assembly may be mounted in a lamp as shown in FIG. 3 where the fixture 400 is located in the lamp body 50 and the socket 700 is mounted in the same location as a traditional Edison socket. Fiber optic cable 600 connects the fixture 400 to the Edison-style socket 700 and may be positioned internally of the lamp. In such an embodiment the decorative cover 604 for the fiber optic cable 600 cover may be eliminated.

Figure 4:
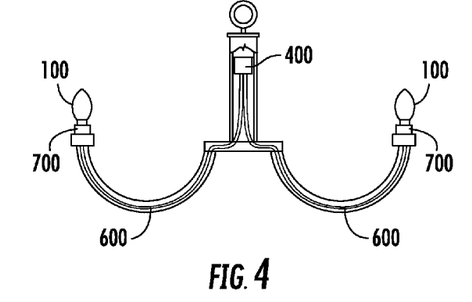

In another embodiment, the assembly may be formed as a chandelier where multiple fiber optic cables 600 extend from one or more fixtures 400 and terminate in a plurality of Edison-style sockets 700 as shown in FIG. 4. Numerous other embodiments of the arrangement of a decorative lighting system may also be provided.

Referring again to FIGS. 1 and 2, the bulb 100 comprises an enclosure 112 that is, in some embodiments, made of glass, quartz, borosilicate, silicate or other suitable material. In some embodiments, the enclosure is of a similar shape to that commonly used in household incandescent bulbs. The enclosure 112 may be coated on the inside with silica 113, or other surface treatment, to provide a diffuse scattering layer that produces a more uniform far field pattern or the surface treatment may be omitted and a clear enclosure may be provided. The enclosure 112 may also be colored. The enclosure 112 may have a traditional bulb shape having a globe shaped main body 114 that tapers to a narrower neck 115. A base 102 such as an Edison-style base may be connected to the neck 115 where the base functions as the physical connector to connect the bulb 100 to the Edison-style socket 700 described above. The Edison-style socket 700 and base 102 may be provided with mating threads that correspond in appearance and size to a standard Edison screw connector such that the base may be screwed into the socket in the same manner as a standard Edison screw. Depending on the embodiment, other base configurations are possible to make the electrical connection such as other traditional-style bases. For example, referring to FIG. 8, a Bayonet-style connector is shown where a bulb 100 having a Bayonet-style base 103 may be connected to a Bayonet-style socket 105. With a Bayonet-style connector the base 103 is inserted into the socket 105 such that lugs 107 engage slots 109. The base is then rotated a partial turn to lock the lugs in the slots. The Bayonet-style connector provides the physical connection between the bulb and the socket but it may not form part of the electrical connection.

Referring again to FIGS. 1 and 2, the bulb 100 comprises an optic element 120 that extends from adjacent the base 102 and that has a distal end 120a that is positioned generally centrally in the enclosure 112 such that it is in approximately the same position as the filament in a traditional incandescent bulb. The optic element 120 may comprise a stem portion 120b that is similarly shaped to the glass stem that is in a traditional incandescent bulb and a filament portion 120c that is shaped similarly to the shape of the area defined by the filament and support wires in a standard incandescent bulb. The optic element 120 may be made of acrylic or other moldable optically transmitting plastic, other plastic material, glass or other light transmitting material. In one embodiment the optic element 120 is transparent. The optic element may be a solid piece of material or it may be formed as a tube with an axially extending interior cavity. An optical connector 124 is provided that transmits light from the fiber optic cable 600 to the optic element 120. Optical connector 124 mates with the connector 710 formed at the end of fiber optic cable 600 such that light from the LEDs 420 is transmitted to the optic element 120. The connector 124 may be a bayonet style optical connector where, as the Edison-style base 102 of the bulb 100 is threaded into engagement with the threads 704 of the Edison-style socket 700, the connector 710 on the socket 700 is inserted into the connector 124 on the base of bulb 100. The optical connectors on the base 102 and socket 700 may be reversed. The connectors 124 and 710 may have a variety of configurations provided that the connectors are able to mate when the bulb 100 is threaded into the socket 700.

The optic element 120 has a structure that disperses the received light in a pattern that mimics the light transmitted from the filament of a traditional incandescent bulb. Light is transmitted along the length of the optic element 120 from the optical connector 124 to the distal end 120a using total internal reflection. The optic element 120 comprises a light emitting area 128 on the on the filament portion 120c that disperses the light from the optic element 120. The light emitting area 128 may comprise a rough or irregular surface, or other surface treatment, that causes the light to be reflected in random directions such that the light undergoes diffuse reflection or scattering. The light emitting area 128 may comprise a roughened surface or an irregular surface and may be provided by scratching, etching or the like. The light emitting area 128 may be added to the optic element 120 or the light emitting area may be provided during formation of the optic element 120 such as during a molding process of the optic element.

Figure 8:
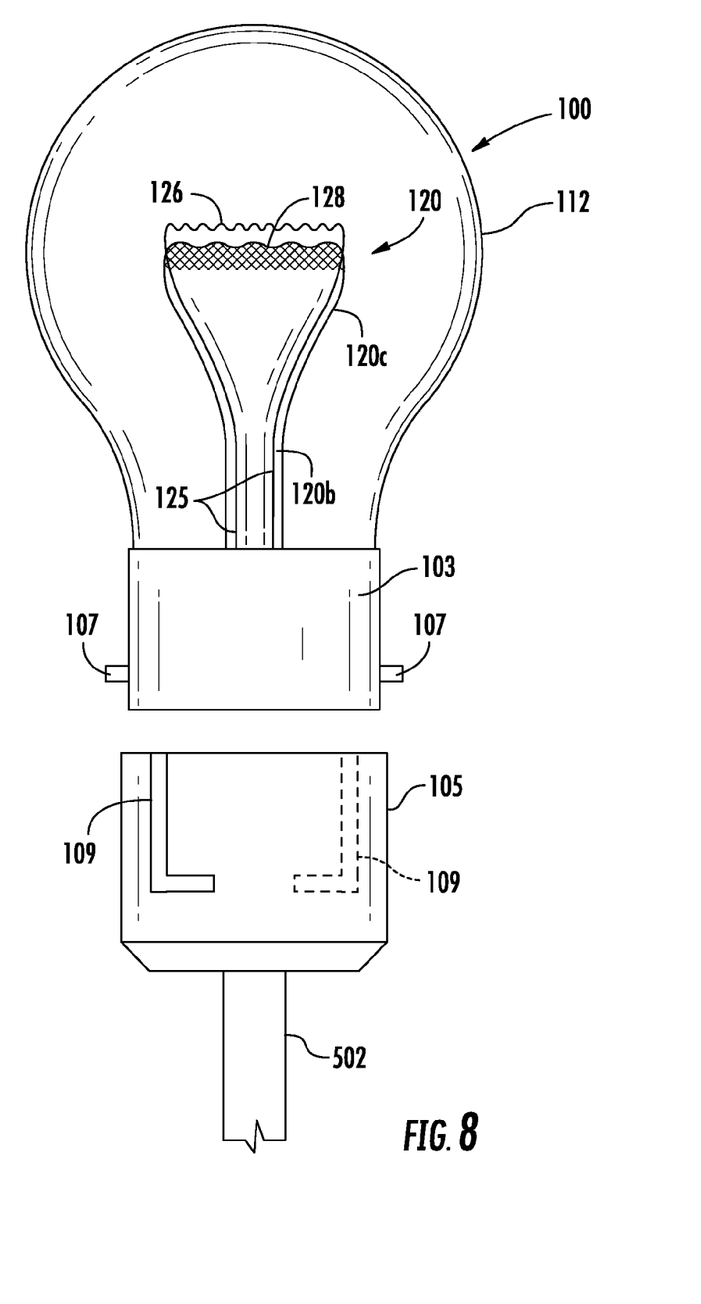
FIG. 8 is a side view of an LED lighting system according to another embodiment of the invention.

Further, the optic element 120 may comprise decorative features to further mimic the look of a traditional incandescent bulb. For example, in one embodiment, a wire 126 may be imbedded in the end of the optical element 120 that mimics the appearance of the filament in a traditional incandescent bulb. The wire 126 is disposed transversely across the end of the optic element 120 such that it is disposed in the same position and orientation as a functioning filament; however, the wire 126 does not perform any lighting function and is merely provided to simulate the look of a traditional incandescent bulb filament. The wire 126 may also be disposed outside of the optical element where the ends of the wire are embedded in the optic element 120 as shown in FIG. 8.

In one embodiment, the LEDs may be controlled to control the color of the light emitted from the optic element 120. In one embodiment, the light is controlled such the light emitted from the optic element 120 is red/orange/red-orange in color. Software may be used to shunt current to and from selected LEDs to control the color of the light emitted by the LED assembly. In one embodiment, the color of the light may be changed from essentially white light to red/orange/red-orange light when a user lowers the current delivered to the LED power supply. In one embodiment a dimmer switch 151 may be provided to control the current delivered to the LED power supply. The dimmer switch 151 may be provided in the electrical path and may be part of the base or fixture or it may be located remotely from the base or fixture such as on a wall as is typical of a standard light switch. When the current delivered to the LED power supply falls below a predetermined value, the power supply software shunts the current to desired LEDs to change the color of the light emitted from the LED assembly. By making the color change to red/orange/red-orange when the current is lowered (such as in response to a user controlled dimmer switch) the optic element 120 can be made to glow red-orange in the area of the light emitting area 128 to simulate the look of a dimmed incandescent bulb. In some embodiments, the color may change as the current passes predetermined levels. For example, at a first level the color may change to red-orange and at a second level the current may change to orange.

Referring to FIG. 7, in a PAR style bulb the optic element 120 and light emitting area 128 may be formed such that the light is directed toward the reflector 206. In such an embodiment, the end of the optic element 120 may be coated with an opaque surface coating such that light is transmitted from the light emitting area 128 of the optic element 120 toward the reflector 206 rather than from the end of the optic element.

Figure 5:
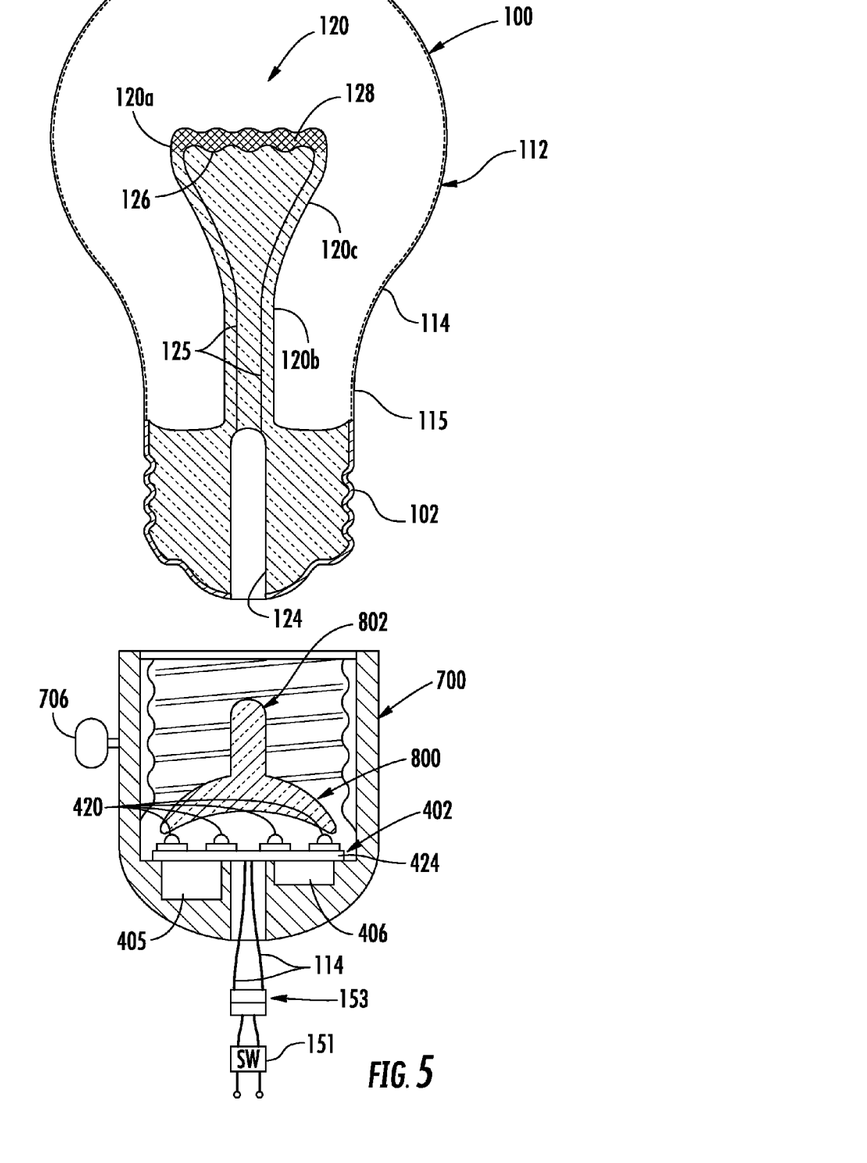
FIG. 5 is a section view of an LED lighting system according to another embodiment of the invention.

Another embodiment of the invention is shown in FIG. 5. In this embodiment the LED assembly 402 and power supply 405 and drivers 406 are located in the Edison-style socket 700 rather than in a separate base. The Edison-style socket 700 may be connected to bulb 100. The socket 700 and base 102 comprise mating Edison-style connectors having threads that may be rotatably engaged to secure the Edison-style socket 700 to the Edison-style bulb 100 where the base 102 functions as the physical connector to connect the lamp 100 to the Edison-style socket 700. The Edison-style connector 102 does not form part of the electrical path to the LEDs. The Edison-style socket 700 may comprise an external structure similar in appearance to the external insulator structure of a standard Edison socket and may include decorative details such as a switch 706. Depending on the embodiment, other base configurations are possible to make the electrical connection such as other traditional-style bases or non-traditional bases. For example, a Bayonet-style connector may be used as previously described with reference to FIG. 8. An LED assembly 402 is mounted in the socket. The LED assembly 402 may be configured as previously described. The LED assembly 402 is thermally coupled to the Edison-style socket 700 such that the socket 700 acts as a heat sink for dissipating heat from the LED assembly. In one embodiment, the socket 700 may be made of aluminum, ceramic or other heat conductive material where the LED assembly 402 is thermally coupled with the socket 700 such that heat is dissipated from the LED assembly 402 through the socket 700. The electronics for the LED assembly 402 such as the power supply 405 and drivers 406 may also be located in the socket 700 such that the socket comprises all of the components for producing light. In some embodiments the power supply 405 and/or drivers 406 may be located outside of the socket 700 but in the electrical path to the LED assembly 402. Electrical current may be provided to the LEDs via wires 114 that may be connected to a source of electrical power. As previously described, the socket 700 may form part of a light fixture or lamp such as described with reference to FIGS. 3 and 4.

A hyperbolic optic or lens 800 receives the light from the LED assembly 402 and focuses the light. While a hyperbolic lens 800 is described any lens or optic may be used that focuses the light such that the light may be received from the LED assembly 402 and transmitted to the bulb 100. The optic or lens 800 is fixed in the socket 700 and terminates in a light pipe or an optical connector 802 such as a bayonet connector, screw connector, snap-fit connector or the like. The Edison-style base 102 of bulb 100, as previously described, may be removably connected to the Edison-style socket 700 and to the light pipe or connecter 802 by screwing the bulb base to the socket. In one embodiment, the bulb 100 and the socket 700 may be permanently connected to one another where the bulb is not removable from the socket. Because the LED assembly 402 has a long life and the bulb 100 only acts as a light dispersion lens, in some embodiments there may be no need to make the bulb 100 removable from the socket 700. The socket and bulb may be connected as a unit to the source of power via conductors 114 and may be provided with a releasable plug type connector 153 such that the integrated socket and bulb may be removed and replaced.

Figure 6:
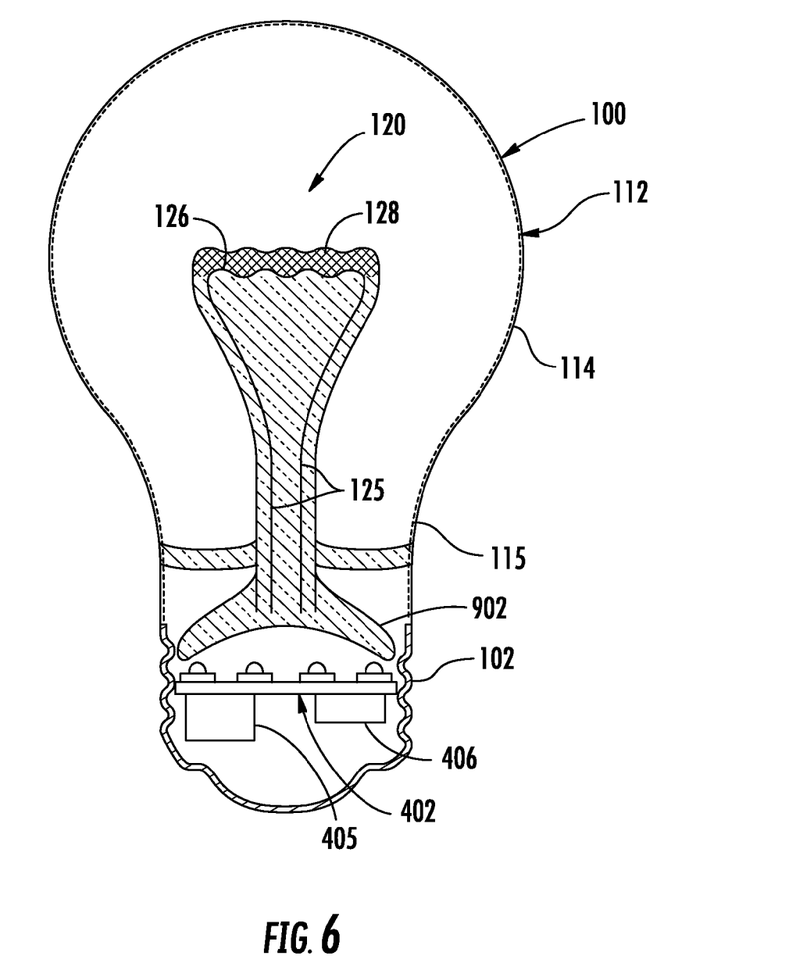
FIG. 6 is a section view of an LED lighting system according to another embodiment of the invention.

Another embodiment of a lighting system of the invention is illustrated in FIG. 6. In this embodiment the LED assembly 402 and power supply 405 and drivers 406 are located in the Edison-style base 112 of bulb 100. The Edison-style base is connected to the neck 115 of bulb 100 where the base 102 functions as the physical connector between the bulb and the socket and as part of the electrical path for connecting the lamp 100 to a traditional Edison socket. Unlike the embodiments described previously, the lamp of FIG. 6 is used with a standard Edison socket rather than with an Edison-style socket. An LED assembly 402 is mounted on a submount in the base 102. The LED assembly 402 may be configured as previously described. The submount and/or PCB board may be thermally coupled to the Edison-style base 102 such that the base 102 acts as a heat sink for dissipating heat from the LED assembly 402. The electronics for the LED assembly 402 such as the power supply 405 and drivers 406 are located in the base 102 such that the base 102 comprises the components for producing light. The power supply 405 is connected to wires or other electrical conductors that may be connected to the base 102 to complete the electrical path to the LED assembly 402. A hyperbolic optic or lens 902 receives the light from the LED assembly 402 and focuses the light and transmits the light from the LED assembly. While a hyperbolic lens 902 is described any lens or optic may be used that focuses the light such that the light may be received by the optic element 120. The optic or lens 902 is fixed in the base 102 and transmits light to the internal optic element 120 of the bulb. The internal optic element 120 may be constructed as previously described. The internal optic element 120 and lens 902 may comprise a one piece member or may be separate components. Such a lighting system may be used with an actual Edison socket rather than with the Edison-style socket of the previous embodiments such that the electrical connection is made via the traditional Edison socket and the Edison-style base 102.

Although specific embodiments have been illustrated and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. An LED lighting system comprising;
an LED assembly for emitting light when energized through an electrical path;
a bulb comprising an optically transmissive enclosure and an optic element in the enclosure for receiving the light emitted by the LED assembly and dispersing the light from the enclosure, and a base connected to the enclosure, the base comprising a traditional-style base configured to be engageable with a traditional-style socket to physically support the bulb in the traditional-style socket, the LED assembly being located in the traditional-style socket, the traditional-style base not being in the electrical path.

2. The LED lighting system of claim 1 wherein the traditional-style base comprises an Edison-style base and the traditional-style socket comprises an Edison-style socket.

3. The LED lighting system of claim 2 wherein the LED assembly is located in the Edison-style socket external of the Edison-style base.

4. The LED lighting system of claim 1 further comprising a lens for receiving the light from the LED assembly and focusing the light to be received by the optic element.

5. The LED lighting system of claim 1 wherein the optic element is transparent.

6. The LED lighting system of claim 5 wherein the optic element comprises a light emitting area.

7. The LED lighting system of claim 6 wherein the light emitting area comprises a light scattering surface.

8. The LED lighting system of claim 1 wherein the bulb is releasably engageable with the socket.

9. An LED lighting system comprising;
an LED assembly for emitting light when energized through an electrical path, the LED assembly and lamp electronics for powering the LED assembly located in a fixture;
a traditional-style socket optically coupled to the LED assembly by an optical transmitter;
a bulb comprising an optically transmissive enclosure and an optic element in the enclosure for receiving the light emitted by the LED assembly and dispersing the light from the enclosure the optic element comprising a stem portion having a shape similar to a glass stem in a traditional incandescent bulb and a filament portion that is shaped and positioned in the enclosure to simulate the appearance of a glowing filament in a traditional incandescent bulb, the stem portion transmitting light to the filament portion and the filament portion comprising a surface treatment for emitting light from the optic element, and a base connected to the enclosure, the base comprising a traditional-style base configured to be releasably engageable with the traditional-style socket to physically support the bulb in the traditional-style socket, the traditional-style base not being in the electrical path.

10. The LED lighting system of claim 9 wherein the optical transmitter comprises a fiber optic cable.

11. The LED lighting system of claim 9 wherein the optical transmitter is removably connected to the fixture.

12. The LED lighting system of claim 9 wherein the optical transmitter is operatively coupled to an optical connector in the socket.

13. The LED lighting system of claim 9 further comprising a lens in the fixture for receiving the light from the LED assembly and focusing the light to be received by the optical transmitter.

14. The LED lighting system of claim 9 further comprising a wire connected to the optic element adjacent the light emitting area.

15. The LED lighting system of claim 9 further comprising a switch for altering current delivered to the LED assembly, the color of the light changing in response to the current.

16. The LED lighting system of claim 9 wherein the traditional-style socket comprises one of an Edison-style socket or a bayonet-style socket and the traditional-style base comprises one of an Edison-style base or a bayonet-style base.

17. An LED lighting system comprising;
   an LED assembly for emitting light when energized through an electrical path, the LED assembly and lamp electronics for powering the LED assembly located in a fixture;
   a traditional-style socket optically coupled to the LED assembly by an optical transmitter;
   a bulb comprising an optically transmissive enclosure and an optic element in the enclosure for receiving the light emitted by the LED assembly and dispersing the light from the enclosure, and a base connected to the enclosure, the base comprising a traditional-style base configured to be releasably engageable with the traditional-style socket to physically support the bulb in the traditional-style socket, the traditional-style base not being in the electrical path the;
   a switch in the electrical path for lowering current delivered to the LED assembly upon manual operation of the switch, the color of the light changing to red/orange/red-orange in response to the lowering of the current.

18. The LED lighting system of claim 16 wherein the traditional-style socket comprises one of an Edison-style socket or a bayonet-style socket and the traditional-style base comprises one of an Edison-style base or a bayonet-style base.

* * * * *

UNITED STATES PATENT AND TRADEMARK OFFICE
CERTIFICATE OF CORRECTION

| | | |
|---|---|---|
| PATENT NO. | : 9,097,396 B2 | Page 1 of 1 |
| APPLICATION NO. | : 13/602954 | |
| DATED | : August 4, 2015 | |
| INVENTOR(S) | : John R. Rowlette, Jr. | |

It is certified that error appears in the above-identified patent and that said Letters Patent is hereby corrected as shown below:

IN THE CLAIMS:

In column 14, claim 17, please change line 9 to:

"being in the electrical path;"

Signed and Sealed this
Fifteenth Day of December, 2015

Michelle K. Lee
*Director of the United States Patent and Trademark Office*